United States Patent
Chen et al.

(10) Patent No.: US 12,079,911 B2
(45) Date of Patent: Sep. 3, 2024

(54) METHOD FOR IMAGE SYNTHESIS, DEVICE FOR IMAGE SYNTHESIS AND STORAGE MEDIUM

(71) Applicant: Beijing Zitiao Network Technology Co., Ltd., Beijing (CN)

(72) Inventors: Zhili Chen, Los Angeles, CA (US); Wenhao Zhang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/642,939

(22) PCT Filed: Aug. 30, 2021

(86) PCT No.: PCT/SG2021/050520
§ 371 (c)(1),
(2) Date: May 5, 2022

(87) PCT Pub. No.: WO2022/093112
PCT Pub. Date: May 5, 2022

(65) Prior Publication Data
US 2024/0054703 A1    Feb. 15, 2024

(30) Foreign Application Priority Data
Oct. 30, 2020    (CN) .......................... 202011198004.7

(51) Int. Cl.
*G06T 11/60*    (2006.01)
*G06T 3/40*    (2006.01)
(Continued)

(52) U.S. Cl.
CPC ................ *G06T 11/60* (2013.01); *G06T 3/40* (2013.01); *G06T 7/12* (2017.01); *G06T 7/13* (2017.01); *G06V 10/46* (2022.01)

(58) Field of Classification Search
CPC .... G06T 3/40; G06T 7/12; G06T 7/13; G06T 11/60
See application file for complete search history.

(56) References Cited

U.S. PATENT DOCUMENTS 6,995,762 B1    2/2006  Pavlidis et al.
2003/0197704 A1  10/2003  Tek et al.
(Continued)

FOREIGN PATENT DOCUMENTS

CN    108550176 A    9/2018
CN    110070554 A    7/2019
(Continued)

OTHER PUBLICATIONS

Hu Weiping; "Research on Personalized Facial Image Synthesis Based on Epistemic Logic"; Dissertation; May 2015; 132 pages (contains English Abstract p. V-VII).

*Primary Examiner* — Charles Tseng
(74) *Attorney, Agent, or Firm* — BakerHostetler

(57) ABSTRACT

A method for image synthesis, a device for image synthesis and a storage medium. The method includes: performing a convex hull extraction on a target object image in an image to be processed to obtain a first boundary frame line; zooming out the first boundary frame line to obtain a second boundary frame line; determining, according to the target object image, at least one target ray where at least one connection point is located in synthesizing a first preset material with the target object image; determining the at least one connection point between the first preset material and the target object image; and synthesizing the first preset material and the target object image. The position of the first preset material in the synthesis result subjected to the image synthesis can be relatively reasonable, an image synthesis effect expected by a user can be achieved.

20 Claims, 7 Drawing Sheets

(51) Int. Cl.
*G06T 7/12* (2017.01)
*G06T 7/13* (2017.01)
*G06V 10/46* (2022.01)

(56) References Cited

U.S. PATENT DOCUMENTS

| | | |
|---|---|---|
| 2004/0135788 A1 | 7/2004 | Davidson et al. |
| 2011/0050685 A1 | 3/2011 | Yamada |
| 2019/0014884 A1* | 1/2019 | Fu ................. G06V 40/168 |
| 2020/0020145 A1* | 1/2020 | Jones ................ G02B 27/0172 |

FOREIGN PATENT DOCUMENTS

| | | |
|---|---|---|
| CN | 110070555 A | 7/2019 |
| CN | 110136092 A | 8/2019 |
| CN | 111598091 A | 8/2020 |
| CN | 111754541 A | 10/2020 |
| JP | 2016-534461 A | 11/2016 |

* cited by examiner

METHOD FOR IMAGE SYNTHESIS, DEVICE FOR IMAGE SYNTHESIS AND STORAGE MEDIUM

The present application is the U.S. National Stage of International Application No. PCT/SG2021/050520, filed on Aug. 30, 2021, which claims priority of Chinese Patent Application No. 202011198004.7, filed on Oct. 30, 2020, and the entire content of which is incorporated herein by reference as part of the present application.

TECHNICAL FIELD

The embodiments of the present disclosure relate to a method for image synthesis, a device for image synthesis and a storage medium.

BACKGROUND

In the field of image processing technology, an image and a preset material are usually synthesized. The preset material is added to the image, and for example, after a target object in the image is recognized, limb and/or expression material may be added to the target object, and limb and/or expression motion may also be controlled. this technology may be applied to the Augmented Reality (abbreviated to AR) technology, or the editing and display of image special effect, so that the interest of image display is improved to meet diverse needs of users.

In known technologies, when the preset material and the target object are synthesized, the synthesis result is often unreasonable and the image synthesis effect expected by the user cannot be achieved, thereby affecting the image display effect and the user experience.

SUMMARY OF THE INVENTION

An embodiment of the present disclosure provides a method for image synthesis, a device and a storage medium, so as to accurately and reasonably determine the position of the connection point between the preset material and the target object image during the image processing process, so that the preset material and the target object image can be combined more reasonably, and the image synthesis effect expected by the user can be achieved.

In the first aspect, an embodiment of the present disclosure provides a method for image synthesis, comprising:
  performing a convex hull extraction on a target object image in an image to be processed to obtain a first boundary frame line;
  zooming out the first boundary frame line toward a center of the first boundary frame line according to a preset ratio to obtain a second boundary frame line;
  determining, according to the target object image, at least one target ray where at least one connection point is located in synthesizing a first preset material with the target object image;
  determining the at least one connection point between the first preset material and the target object image, according to the first boundary frame line, the second boundary frame line, a contour of the target object image, and the at least one target ray; and
  synthesizing the first preset material and the target object image according to the at least one connection point, and displaying a synthesis result.

In the second aspect, an embodiment of the present disclosure provides a device for image synthesis, comprising:
  a boundary extraction unit, configured to perform a convex hull extraction on a target object image in an image to be processed to obtain a first boundary frame line, and to zoom out the first boundary frame line toward a center of the first boundary frame line according to a preset ratio to obtain a second boundary frame line;
  a ray construction unit, configured to determine, according to the target object image, at least one target ray where at least one connection point is located in synthesizing a first preset material with the target object image;
  a connection point determination unit, configured to determine the at least one connection point between the first preset material and the target object image, according to the first boundary frame line, the second boundary frame line, a contour of the target object image, and the at least one target ray; and
  an image synthesis unit, configured to synthesize the first preset material and the target object image according to the at least one connection point, and to display a synthesis result.

In the third aspect, an embodiment of the present disclosure provides an electronic device, comprising:
  at least one processor; and
  a memory;
  wherein the memory stores a computer execution instruction, the at least one processor executes the computer execution instruction stored in the memory, causing the electronic device to perform the method for image synthesis described in the first aspect and various possible designs of the first aspect.

In the fourth aspect, an embodiment of the present disclosure provides a computer-readable storage medium, wherein the computer-readable storage medium stores a computer execution instruction, and in a case where a processor executes the computer execution instruction, the method for image synthesis described in the first aspect and various possible designs of the first aspect is realized.

An embodiment of the present disclosure provides a method for image synthesis, a device for image synthesis and a storage medium. In the method, performing a convex hull extraction on a target object image in an image to be processed to obtain a first boundary frame line; zooming out the first boundary frame line toward a center of the first boundary frame line according to a preset ratio to obtain a second boundary frame line; determining, according to the target object image, at least one target ray where at least one connection point is located in synthesizing a first preset material with the target object image; determining the at least one connection point between the first preset material and the target object image, according to the first boundary frame line, the second boundary frame line, a contour of the target object image and the at least one target ray; and, synthesizing the first preset material and the target object image according to the at least one connection point, and displaying a synthesis result. In the embodiments of the present disclosure, based on the obtained first boundary frame line, second boundary frame line and the contour of the target object image, an allowable range of the connection point is defined, and the range neither has a large gap with the target object image nor falls too much into the target object image. The connection point between the first preset material and the target object image is determined by the target ray within the range, so that the position of the connection point is reasonable, and the position of the first preset material in the synthesis result subjected to the image synthesis can be relatively reasonable, an image synthesis effect expected by a user can be achieved, and an image display effect and a user experience can be improved.

BRIEF DESCRIPTION OF THE DRAWINGS

In order to more clearly illustrate the technical solutions in the embodiments of the present disclosure or the known technologies, the following briefly introduces the accompanying drawings that are required in the description of the embodiments or the known technologies. Obviously, the accompanying drawings in the following description are some embodiments of the present disclosure. For those skilled in the art, other drawings can also be obtained based on these drawings without any creative effort.

DETAILED DESCRIPTION

Figure 1:
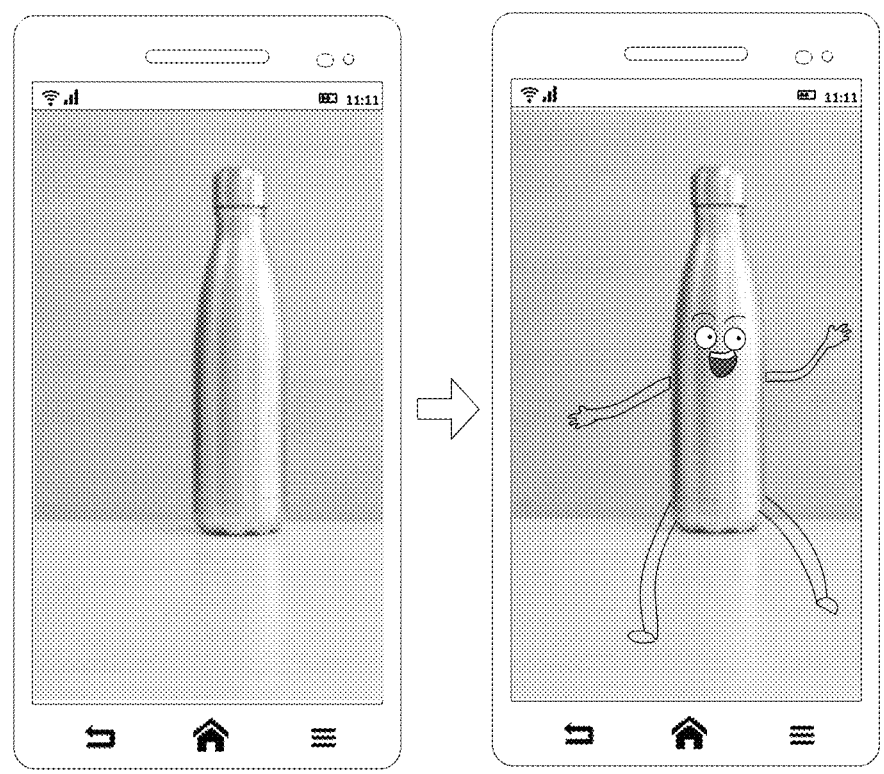
FIG. 1 is a schematic diagram of an application scenario of a method for image synthesis provided in an embodiment of the present disclosure.

In order to make the purposes, technical solutions and advantages of the embodiments of the present disclosure clearer, the technical solutions in the embodiments of the present disclosure will be clearly and completely described below with reference to the accompanying drawings in the embodiments of the present disclosure. Obviously, the described embodiments are some, but not all, embodiments of the present disclosure. Based on the embodiments in the present disclosure, all other embodiments obtained by those skilled in the art without creative efforts shall fall within the protection scope of the present disclosure.

In order to solve technical problems in known technologies, embodiments of the present disclosure provide a method for image synthesis. In the method, performing a convex hull extraction on a target object image in an image to be processed to obtain a first boundary frame line; zooming out the first boundary frame line toward a center of the first boundary frame line according to a preset ratio to obtain a second boundary frame line; performing the axis extraction on the target object image, determining the at least one target ray according to the axes, and the at least one target ray and the axes respectively forming a preset included angle; determining the at least one connection point between the first preset material and the target object image, according to the first boundary frame line, the second boundary frame line, a contour of the target object image, and the at least one target ray. Because the first boundary frame line is located outside the target object image, and the second boundary frame line is a boundary frame line obtained by zooming out the first boundary frame line, the second boundary frame line may intersect with the contour of the target object image. Therefore, based on the obtained first boundary frame line, second boundary frame line and the contour of the target object image, an allowable range of the connection point may be defined, and the range neither has a large gap with the target object image nor falls too much into the target object image. Furthermore, based on the target ray having intersection points with all of the first boundary frame line, the second boundary frame line and the contour of the target object image, a suitable intersection point may be determined from the intersection points, and the suitable intersection point may be used as the connection point between the first preset material and the target object image, so that in the case of a random shape of the target object image, the determined connection point is in a reasonable position, and there is neither a large gap with the target object image, nor falling too much into the target object image. Furthermore, synthesizing the first preset material and the target object image according to the at least one connection point to obtain a synthesis result of the target object image, and displaying the synthesis result. Therefore, a position of the first preset material in the synthesis result of the target object image can be relatively reasonable, an image synthesis effect expected by a user can be achieved, an image display effect and a user experience can be improved.

The method for image synthesis provided in the embodiments of the present disclosure is applicable to an application scenario shown in FIG. 1. An image may be collected as the image to be processed, by a terminal device such as a mobile phone, a tablet computer and the like. The method for image synthesis of the present disclosure may be implemented by the terminal device. The first preset material is added to the target object image, for example, as shown in FIG. 1, a preset limb material is added to a water bottle to obtain the synthesis result of the target object image, and finally the synthesis result is stored and/or displayed.

The image to be processed may be a static image or an image collected in real time, for example, the image collected in real time may be applied to the field of Augmented Reality. In addition, the image synthesis result may also be dynamically displayed, and for example, after the addition of the limb to the water bottle in FIG. 1, specific motion, such as dancing, jumping and the like, may be performed.

Of course, the method for image synthesis provided in the embodiments of the present disclosure is also applicable to a scene where a terminal device collects an image and sends the image to a server as the image to be processed, the server implements the method for image synthesis of the present disclosure and sends the synthesis result to the terminal device, with the synthesis result displayed on the terminal device; and alternatively, the server obtains the image to be processed by other ways, and the server implements the method for image synthesis of the present disclosure, and finally stores the synthesis result, and when a viewing request is received from other device, the synthesis result is sent to the device and displayed on the device.

In the above application scenarios, when determining the connection point between the first preset material and the target object image, performing the convex hull extraction on the target object image in the image to be processed to obtain the first boundary frame line; zooming out the first boundary frame line toward a center of the first boundary frame line according to the preset ratio to obtain the second boundary frame line; determining, according to the target object image, at least one target ray where at least one connection point is located in synthesizing the first preset material with the target object image; determining the at least one connection point between the first preset material and the target object image, according to the first boundary frame line, the second boundary frame line, a contour of the target object image, and the at least one target ray; and synthesizing the first preset material and the target object image according to the at least one connection point, and displaying a synthesis result. Based on the obtained first boundary frame line, second boundary frame line and the contour of the target object image, the allowable range of the connection point is defined, the range neither has a large gap with the target object image nor falls too much into the target object image. The connection point between the first preset material and the target object image is determined by the target ray within the range, so that the position of the first preset material in the synthesis result subjected to the image synthesis can be relatively reasonable, an image synthesis effect expected by a user can be achieved, and an image display effect and a user experience can be improved.

Figure 2:
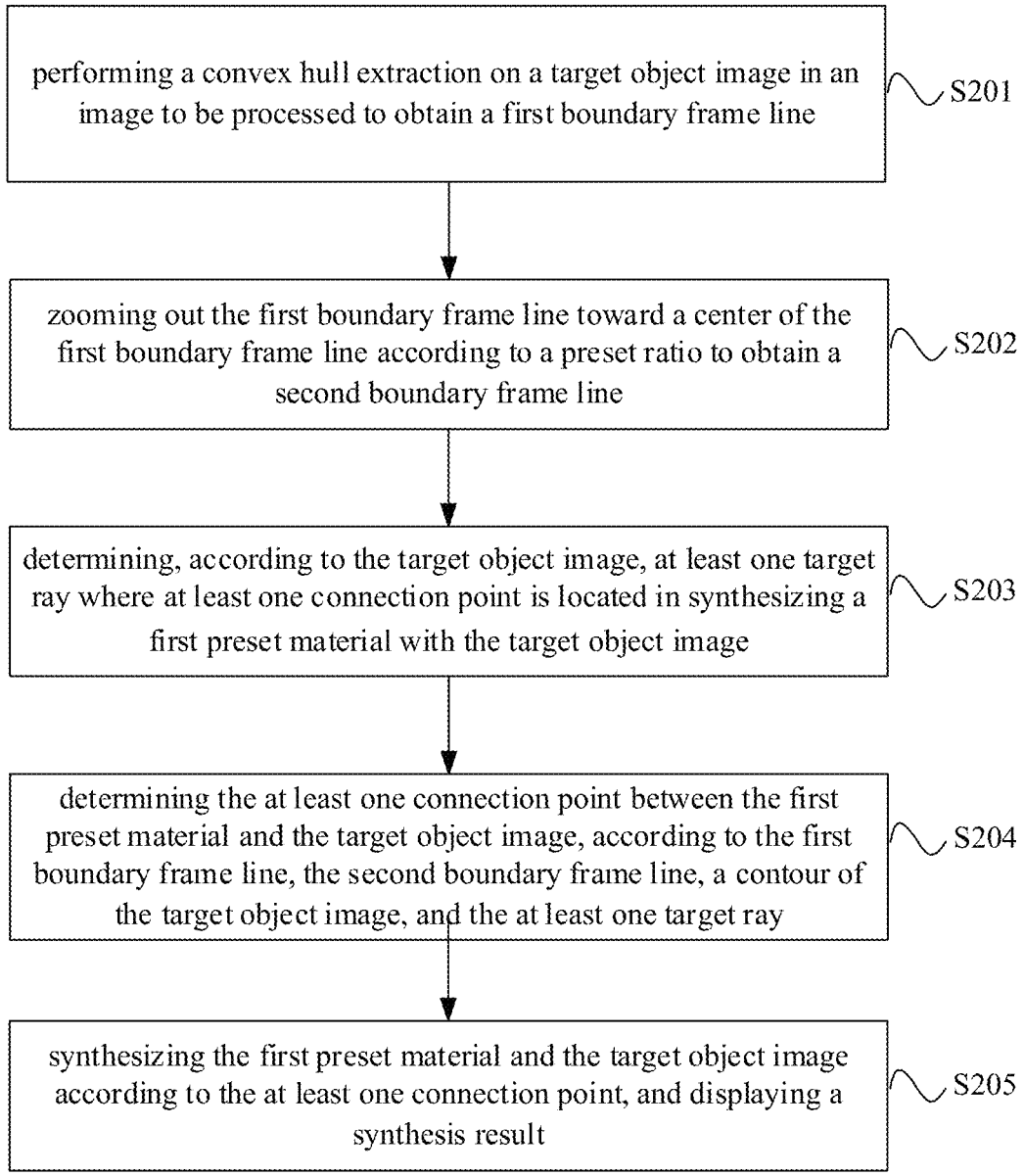
FIG. 2 is a flow diagram of a method for image synthesis provided in an embodiment of the present disclosure.

Referring to FIG. 2, FIG. 2 is a flow diagram of a method for image synthesis provided in an embodiment of the present disclosure. The method in the embodiment may be applied to an electronic device such as the terminal device or the server, and the method for image synthesis includes:

S201: performing the convex hull extraction on the target object image in the image to be processed to obtain the first boundary frame line.

Figure 4:
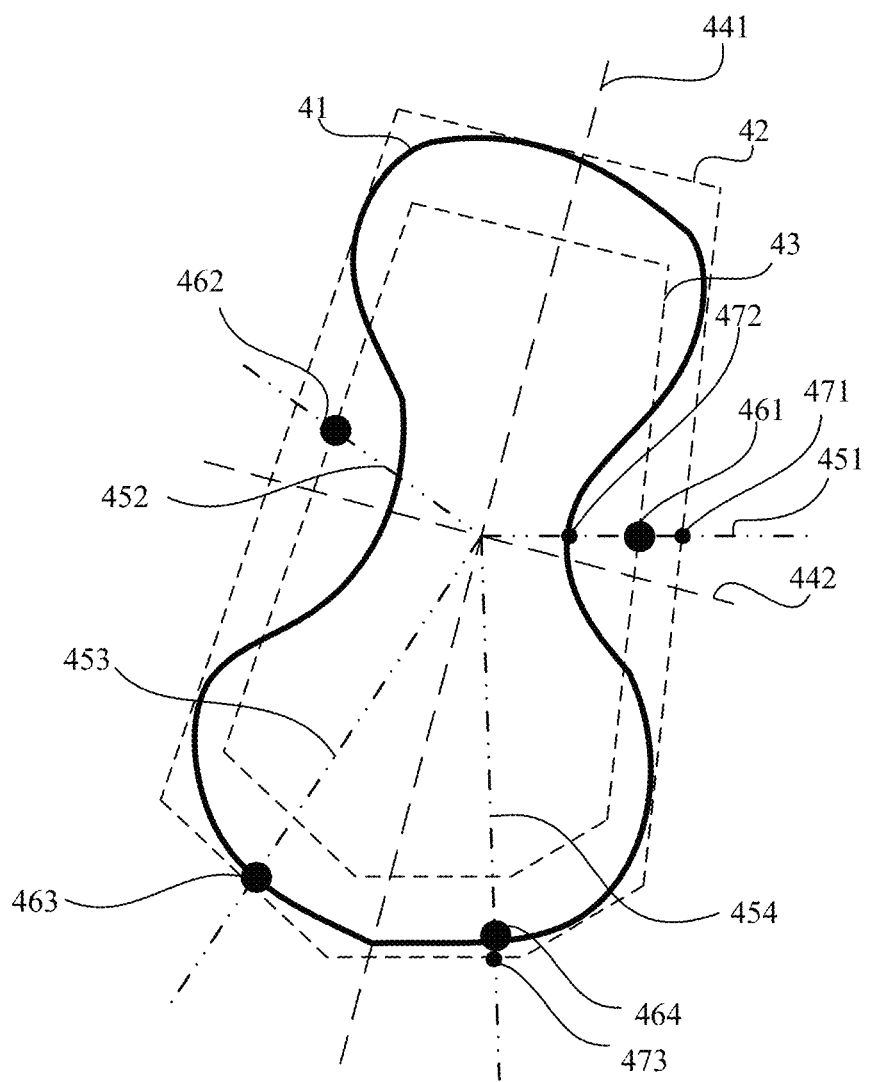
FIG. 4 is a specific schematic diagram of the determination of connecting points by a method for image synthesis provided in an embodiment of the present disclosure.

In the embodiment, the first preset material is a preset material that needs to be added to an edge of a target object in the image to be processed. When it is necessary to synthesize the first preset material and the target object image, the electronic device may first extract a convex hull of the target object image as the first boundary frame line by a Convex Hull algorithm. As shown in FIG. 4, the first boundary frame line 42 is obtained by performing the convex hull extraction on the target object image. In the embodiment, any kinds of Convex Hull algorithms may be used, such as a Graham scanning algorithm, a Jarvis step-by-step method and the like, which may not be limited in the embodiment.

Optionally, in the embodiment, before performing the convex hull extraction on the target object image in the image to be processed, the electronic device may first perform an object segmentation on the target object in the image to be processed to obtain the target object image. The electronic device may run a preloaded object segmentation algorithm to perform the object segmentation on the target object in the image to be processed. In one embodiment, the object segmentation algorithm may include a salient object segmentation algorithm. In the segmentation algorithm, during segmentation, a salient object in the image to be processed may be taken as the target object during the segmentation and the target object image may be segmented, and the salient object may be an object in a real-time scene image that differs significantly from a background color, and may also be an object in a central region of the real-time scene image, or an object with the largest region in the real-time scene image. Of course, the target object in the embodiment may also be an object designated by a user in the image to be processed, which is not limited in the embodiment. In addition, the object segmentation algorithm in the embodiment may also be other image segmentation algorithm, which will not be repeated herein.

S202: zooming out the first boundary frame line toward a center of the first boundary frame line according to a preset ratio to obtain a second boundary frame line.

In the embodiment, after obtaining the first boundary frame line, zooming out the first boundary frame line toward a center of the first boundary frame line. That is to say, with the center of the first boundary frame line as a benchmark, zooming out the first boundary frame line toward the benchmark to obtain a boundary frame line taken as the second boundary frame line. As shown in FIG. 4, zooming out the first boundary frame 42 toward a center of the first boundary frame line to obtain the second boundary frame line 43. In the present embodiment, a zooming-out ratio in the embodiment is the preset ratio, such as 80%, and the preset ration may be set according to practical needs.

S203: determining, according to the target object image, at least one target ray where at least one connection point is located in synthesizing a first preset material with the target object image.

In the embodiment, at least one target ray may be constructed in the target object image, and at least one connection point is located on at least one target ray when synthesizing a first preset material with the target object image, so that the connection point may be determined based on the target ray, such as the target rays 451, 452, 453 and 454 as shown in FIG. 4.

At least one target ray may be determined according to the axis of the target object image. In one embodiment, performing an axis extraction on the target object image. When extracting the axis of the target object image, the target object image does not need to be symmetrical, and then, determining at least one target ray according to the axis, at least one target ray has a corresponding preset included angle with the axis.

S204: determining the at least one connection point between the first preset material and the target object image, according to the first boundary frame line, the second boundary frame line, a contour of the target object image, and the at least one target ray.

In the embodiment, based on the first boundary frame line, the second boundary frame line and the contour of the target object image, the allowable range of the connection point may be defined, and the range neither has a large gap with the target object image nor falls too much into the target object image. At least one target ray has intersection points with all of the first boundary frame line, the second boundary frame line and the target object image contour, so that when determining at least one of connection point between the first preset material and the target object image, an appropriate intersection point may be selected from these above intersection points as the connection point. For example, selecting the appropriate intersection point from the above intersection points as the connection point according to information such as the target object image contour, so that the selected connection point can neither have a large gap with the target object image nor fall too much into the target object image, the relative position between the connection point and the target object image is more reasonable, thereby enabling a position where the first preset material is placed in the synthesis result of the subsequently synthesized target object image to be more reasonable. For example, when the contour of the target object image is too concave, the intersection point between the target ray and the second bounding frame line may be used as the connection point. At this time, the connection point neither falls too much into the target object image, nor has a large gap with the target object image. As shown in FIG. 4, a middle portion of the contour of the target object image 41 is too concave, and the connection point 461 and connection point 462 determined by the embodiment neither fall too much into the target object image nor have a large gap with the target object image. If the second boundary frame line is located inside the contour of the target object image, the intersection point between the target ray and the contour of the target object image may be taken as the connection point. At this time, the connection point is located on the contour of the target object image and do not fall into the contour of the target object image. As shown in a lower half of the contour of the target object image 41 in FIG. 4, the second boundary frame line 43 is located inside the contour of the target object image 41, and the connection point 463 and the connection point 464 determined by the embodiment are located on the contour of the target object image 41 and do not fall into the target object image. It is necessary to explain that the first boundary frame line in the embodiment may be taken as a reference benchmark in determining the connection point, and the connection point generally exceeds the first boundary frame line, otherwise the distance between the connection point and the contour of the target object image is too large, and the position of the connection point is inappropriate. It can also be seen from FIG. 4 that the distance between the first boundary frame line 42 and the contour of the target object image 41 is too large in some locations, if a connection point near these locations is outside the first boundary frame line 42, the distance between the contour of the target object image 41 and the connection point is too large, and the position of the connection point is inappropriate.

S205: synthesizing the first preset material and the target object image according to the at least one connection point, and displaying a synthesis result.

In the embodiment, the first preset material is connected with the target object image at the above determined connection point to realize the image synthesis, so that the synthesis result may be displayed.

Optionally, the first preset material in the embodiment may be an animation material. For example, in a scene of adding a limb to the target object, the first preset material is an animation material of the limb with a certain motion. After the animation material of the limb is connected with the target object image at the at least one connection point, the animation material may be played, so as to dynamically display the obtained synthesis result, and that is, display the limb growing on the target object image and performing the specific motion, such as hand waving, dancing and the like, thereby improving the user experience. In addition, optionally, a three-dimensional processing may be performed on the synthesis result to convert the synthesis result in the form of a two-dimensional image into a three-dimensional image, so that the synthesis result after the three-dimensional processing may be dynamically displayed, and for example, after the three-dimensional processing, the target object image with the limb growing on it may perform the specific motion in a three-dimensional space, such as rotation, etc., which can be applied to fields such as the Augmented Reality (AR) technology.

In the method for image synthesis provided in the embodiment, performing a convex hull extraction on a target object image in an image to be processed to obtain a first boundary frame line; zooming out the first boundary frame line toward a center of the first boundary frame line according to a preset ratio to obtain a second boundary frame line; determining, according to the target object image, at least one target ray where at least one connection point is located in synthesizing a first preset material with the target object image; determining the at least one connection point between the first preset material and the target object image, according to the first boundary frame line, the second boundary frame line, a contour of the target object image, and the at least one target ray; and synthesizing the first preset material and the target object image according to the at least one connection point, and displaying a synthesis result. In the embodiments of the present disclosure, based on the obtained first boundary frame line, second boundary frame line and the contour of the target object image, an allowable range of the at least one connection point is defined, and the range neither has a large gap with the target object image nor falls too much into the target object image. The connection point between the first preset material and the target object image is determined by the target ray within the range, so that the position of the connection point is reasonable, and the position of the first preset material in the synthesis result subjected to the image synthesis can be relatively reasonable, an image synthesis effect expected by a user can be achieved, and an image display effect and a user experience can be improved.

Figure 3:
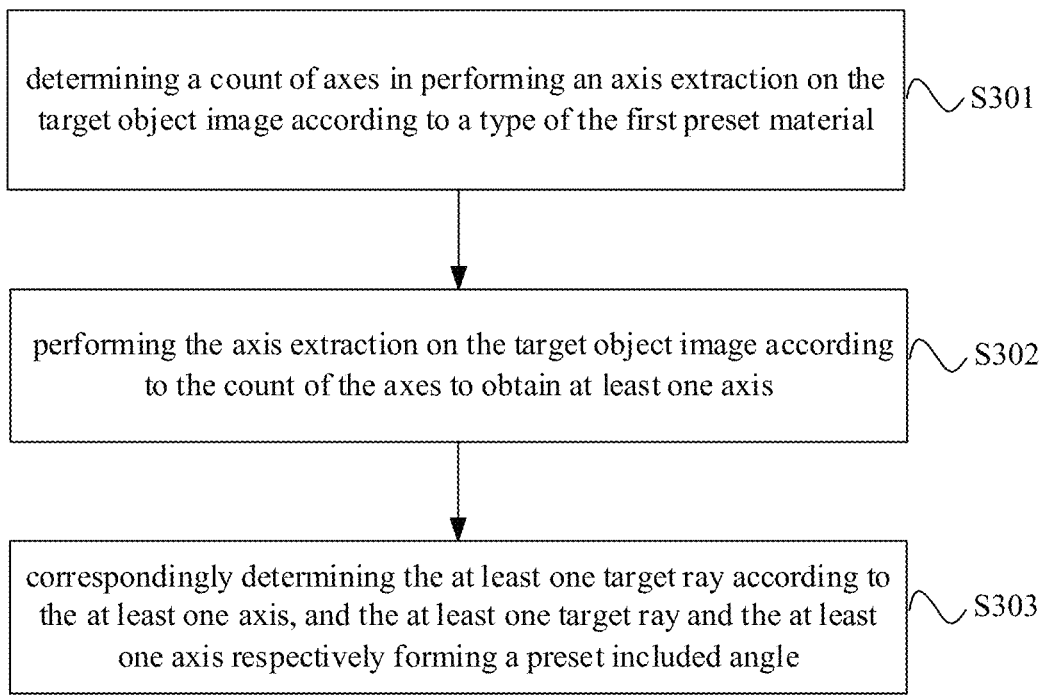
FIG. 3 is a flow diagram of a method for image synthesis provided in another embodiment of the present disclosure.

Based on any one of the above embodiments, as shown in FIG. 3, when determining, according to the target object image, at least one target ray where at least one connection point is located in synthesizing a first preset material with the target object image, which is described in the step S203, the axis extraction may be performed on the target object image to obtain at least one axis, and then at least one target ray is determined with at least one axis as the benchmark. The process may specifically include:

S301: determining a count of axes in performing an axis extraction on the target object image according to a type of the first preset material;

S302 performing the axis extraction on the target object image according to the count of the axes to obtain at least one axis; and S303: correspondingly determining the at least one target ray according to the at least one axis, and the at least one target ray and the at least one axis respectively forming a preset included angle.

In the embodiment, the first preset material is the preset material needing to be added to the edge of the target object in the image to be processed, the first preset material is not limited to the limb material, and according to the practical needs the first preset material may also include wings, wheel, antenna, tool, weapon, lace, couplet, decoration and the like. Considering that different types of first preset materials may require different numbers of connection points, and these connection points may also have different positions, so that the required target rays may also vary from material type to material type. Further, the required number of the axes as the benchmarks for constructing the target ray may also be different, and that is, the number of the axes, the number of the connection points and the number of the target rays have specific corresponding relationships with the type of the first preset material. For example, for the limb material including upper limbs and lower limbs, there may be four corresponding connection points, and there are correspondingly four target rays. As shown in FIG. 4, two axes 441 and 442 may be extracted, and on the basis of the axis 441 and axis 442, four target rays 451, 452, 453 and 454 are constructed, and the four target rays 451, 452, 453 and 454 respectively intersect with the contour of the target object image 41 or the second boundary frame line 43, so as to obtain four corresponding connection points 461, 462, 463 and 464, and the second boundary frame line 43 is obtained by zooming out the first boundary frame line 42 toward a center of the first boundary frame line 42 according to the preset ratio. For a wing or wheel material, a horizontal axis may be extracted, and on the basis of the horizontal axis, two target rays may be constructed, so as to obtain two corresponding connection points. For other type of the first preset material, there will be no example given one by one herein.

Therefore, in the embodiment, the number of axes in performing the axis extraction of the target object image, may be first determined according to the type of the first preset material, and then the axis extraction may be performed on the target object image according to the number of axes, so that at least one target ray is constructed on the basis of the extracted axes.

Of course, in an optional embodiment, it is also possible to extract a fixed number of axes for all types of first preset materials, and then select the desired axis from the fixed number of axes as a reference to construct a target ray, and the predetermined number of axes may be two axes, or may be a plurality of axes.

On the basis of the above embodiments, when performing the axis extraction on the target object image, a principal component analysis may be performed on the target object image region by a Principle Component Analysis (PCA) algorithm, so as to obtain the axes of the target object image. Specifically, firstly, obtaining the pixel coordinates of pixels in the target object image region, constructing a coordinate matrix according to the pixel coordinates, obtaining a plurality of eigenvalues and eigenvectors corresponding to the eigenvalues according to the coordinate matrix, and then sequencing the eigenvalues to select one or more largest eigenvalues, determining the axis according to the eigenvectors corresponding to the one or more largest eigenvalues. The process of extracting the axis of the target object image through the principal component analysis algorithm may use a conventional extraction process, which will not be described in detail herein.

As an example, when the count of the axes is two, performing a principal component analysis on the target object image by a principle component analysis algorithm may include: selecting eigenvectors corresponding to two largest eigenvalues to determine the two axes as a first axis and a second axis of the target object image.

On the basis of the above embodiments, when determining the at least one target ray according to the axes, taking an intersection point between the first axis and the second axis as a starting endpoint of the at least one target ray; and creating the at least one target ray that starts from the starting endpoint and forms a corresponding preset included angle with the first axis or the second axis. Specifically, as shown in FIG. 4, as an example, the target rays 451, 452, 453, and 454 all take the intersection point between the axis 441 and axis 442 as the starting endpoint, and the preset angle between the target ray 451 and the axis 442 is 15° counterclockwise, the preset angle between the target ray 452 and the axis 442 is 15° clockwise, the preset angle between the target ray 453 and the axis 441 is 15° clockwise, and the preset angle between the target ray 454 and the axis 441 is 15° counterclockwise.

On the basis of any one of the above embodiments, the step S204 of determining the at least one connection point between the first preset material and the target object image according to the first boundary frame line, the second boundary frame line, a contour of the target object image, and the at least one target ray, may specifically include:

for any one target ray of the at least one target ray, determining a first intersection point or a second intersection point as one connection point between the first preset material and the target object image, and the first intersection point is an intersection point between the any one target ray and the second boundary frame line, and the second intersection point is an intersection point between the any one target ray and the contour of the target object image. For example, as shown in FIG. 4, on the target ray 451, the intersection point 461 between the target ray 451 and the second boundary frame line 43 is the first intersection point, and the intersection point 471 between the target ray 451 and the contour of the target object image 41 is the second intersection point.

In the embodiment, for any one target ray, an intersection point between the target ray and the second boundary frame line is marked as the first intersection point, and an intersection point between the target ray and the contour of the target object image is marked as the second intersection point. According to the practical needs, one of the first intersection point and the second intersection point may be selected as the connection point between the first preset material and the target object image by a preset strategy, so that the selected connection point neither has a large gap with the target object image nor falls too much into the target object image.

Figure 5:
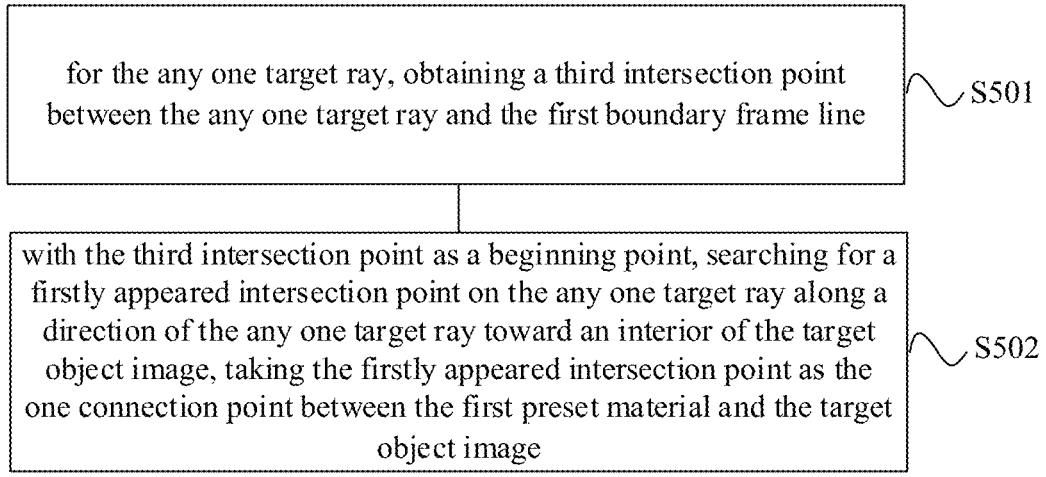
FIG. 5 is a flow diagram of a method for image synthesis provided in still another embodiment of the present disclosure.

In one possible implementation, as shown in FIG. 5, for any one target ray of the at least one target ray, determining a first intersection point or a second intersection point as one connection point between the first preset material and the target object image, may specifically include:

S501: for the any one target ray, obtaining a third intersection point between the any one target ray and the first boundary frame line; and S502: with the third intersection point as a beginning point, searching for a firstly appeared intersection point on the any one target ray along a direction of the any one target ray toward an interior of the target object image, taking the firstly appeared intersection point as the one connection point between the first preset material and the target object image;

Here, the firstly appeared intersection point is the first intersection point between the any one target ray and the second boundary frame line, or the second intersection point between the any one target ray and the contour of the target object image.

In the embodiment, when determining the connection point on a certain target ray, obtaining the intersection point between the target ray and the first boundary frame line, and the intersection point is recorded as the third intersection; and then, taking the third intersection point as the starting point, searching for a firstly appeared intersection point(that is, the first intersection point on the target ray along that direction) on the any one target ray along a direction of the any one target ray toward an interior of the target object image; if the firstly appeared intersection point is the intersection point between the target ray and the second bounding box line (i.e., the first intersection point), taking the first intersection point as the one connection point between the first preset material and the target object image, at this time, it is not necessary to continue looking for the secondly appeared intersection point on the target ray; if the firstly appeared intersection point is the intersection point between the target ray and the contour of the target object image (that is, the second intersection), then taking the second intersection point as the one connection point between the first preset material and the target object image, and at this time, it is not necessary to continue looking for the secondly appeared intersection point on the target ray.

Taking FIG. 4 for example, for the target ray 451, the intersection point between the target ray 451 and the first boundary frame line 42 is marked as the third intersection point 471, with the third intersection point 471 as the starting point, searching for a firstly appeared intersection point on the target ray 451 along a direction of the target ray 451 toward an interior of the target object image; and determining that the firstly appeared intersection point is the intersection point 461 between the target ray 451 and the second boundary frame line 43, so that the intersection point 461 is taken as the connection point corresponding to the target ray 451. For the target ray 454, the intersection point between the target ray 454 and the first boundary frame line 42 is marked as the third intersection point 473, with the third intersection point 473 as the beginning point, searching for a firstly appeared intersection point on the target ray 454 along a direction of the target ray 454 toward an interior of the target object image; and determining that the firstly appeared intersection point is the intersection point 464 between the target ray 454 and the contour of the target object image 41, so that the intersection point 464 is taken as the connection point corresponding to the target ray 454.

Figure 6:
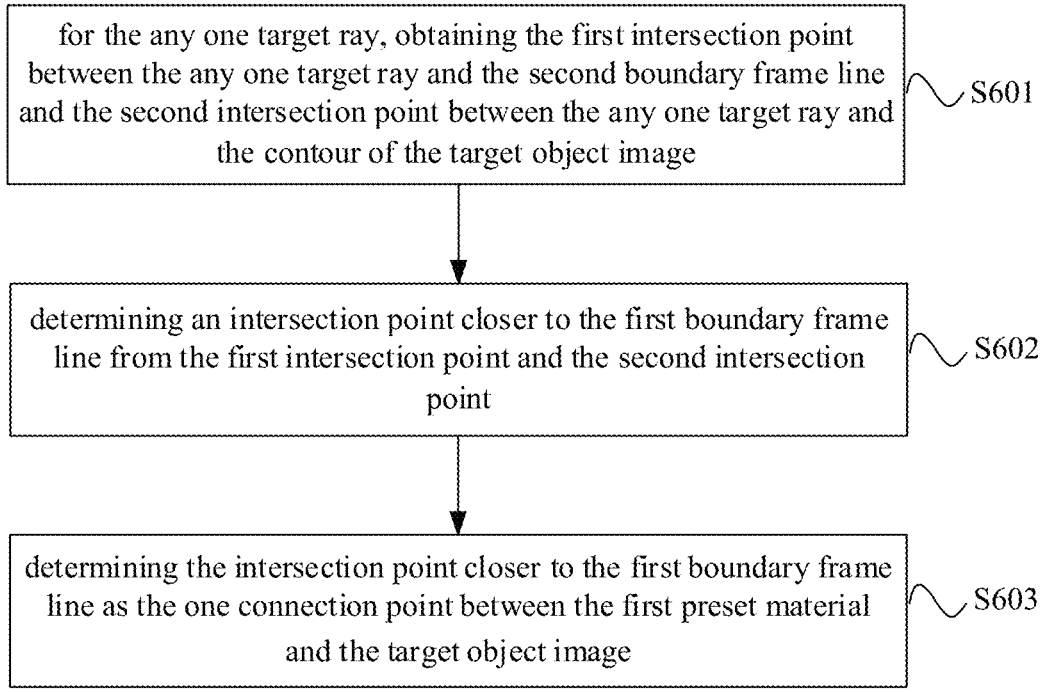
FIG. 6 is a flow diagram of a method for image synthesis provided in still another embodiment of the present disclosure.

In another possible implementation, as shown in FIG. 6, for any one target ray of the at least one target ray, determining a first intersection point or a second intersection point as one connection point between the first preset material and the target object image, comprises:

S601: for the any one target ray, obtaining the first intersection point between the any one target ray and the second boundary frame line and the second intersection point between the any one target ray and the contour of the target object image;

S602: determining an intersection point closer to the first boundary frame line from the first intersection point and the second intersection point; and S603: determining the intersection point closer to the first boundary frame line as the one connection point between the first preset material and the target object image.

In this embodiment, when determining the connection point on a certain target ray, the first intersection point between the target ray and the second boundary frame line, and the second intersection point between the target ray and the contour of the target object image may be obtained first, and then determining the intersection point closer to the first boundary frame line from the first intersection point and the second intersection point. If the first intersection point is closer to the first boundary frame line, then determining the first intersection point as the connection point between the first preset material and the target object image. If the second intersection point is closer to the first boundary frame line, determining the second intersection point as the connection point between the first preset material and the target object image.

Optionally, when determining an intersection point closer to the first boundary frame line from the first intersection point and the second intersection point, first obtaining the third intersection point between the target ray and the first boundary frame line, then obtaining a distance between the first intersection point and the third intersection point, and a distance between the second intersection point and the third intersection point, and determining which one is closer to the first boundary frame line based on the two distances.

Taking FIG. 4 for example, for the target ray 451, determining the intersection point between the target ray 451 and the second boundary frame line 43 as the first intersection point 461, determining the intersection point between the target ray 451 and the contour of the target object image 41 as the second intersection point 472, and determining the intersection point between the target ray 451 and the first boundary frame line 42 as the third intersection point 471; and then obtaining a distance between the first intersection point 461 and the third intersection point 471, and a distance between the second intersection point 472 and the third intersection point 471. By comparing the two distances, it can be found that the distance between the first intersection point 461 and the third intersection point 471 is smaller than the distance between the second intersection point 472 and the third intersection point 471, so that the first intersection point 461 is closer to the first boundary frame line 42, and that is, the intersection point 461 between the target ray 451 and the second boundary frame line 43 is taken as the connection point corresponding to the target ray 451.

The strategies described above in FIG. 5 and FIG. 6 may obtain the same result in determining the connection points, which are only illustrative. According to different requirements, different strategies may be selected, which are not limited in the embodiments of the present disclosure.

On the basis of any one of the above embodiments, if a length-width ratio of the target object image exceeds a preset threshold, performing at least one of following steps according to the length-width ratio of the target object image:
translating the first axis or the second axis; and
adjusting the preset included angle.

In the embodiment, considering that it is possible for the length-width ratios of some target object images to be relatively large, it is necessary to adjust the axis and/or the preset included angle accordingly to adapt to the larger length-width ratio, so that the position of the determined connection point is more reasonable. For example, taking the addition of the limb material to the target object as an example, if the length-width ratio of the target object image is relatively large, in order to make the effect of the image synthesis better, it is necessary to raise the position of the connection point of the upper limbs accordingly, so that the synthesis result after the addition satisfies a natural shape of a body structure. Therefore, the position of the corresponding connection point may be adjusted by translating the axis and/or adjusting the preset included angle of the target ray.

On the basis of any one of the above embodiments, in the embodiment during the image synthesis, in addition to adding the first preset material to the edge of the target object image, a second preset material may be added inside the target object image, such as an expression material and the like.

Figure 7:
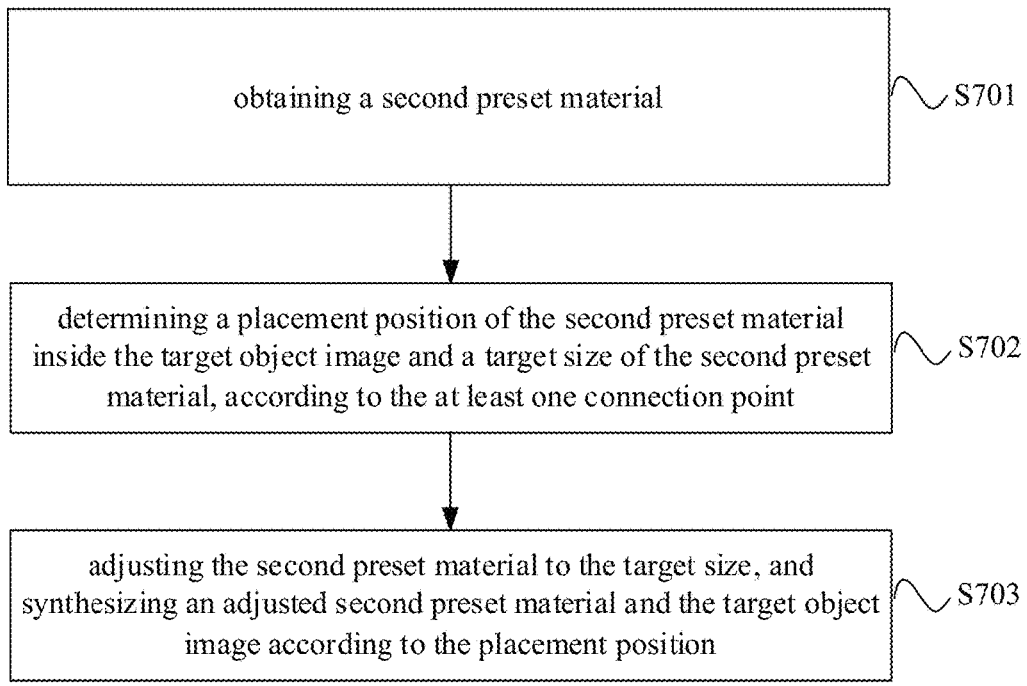
FIG. 7 is a flow diagram of a method for image synthesis provided in still another embodiment of the present disclosure.

Further, on the basis of the above embodiments, as shown in FIG. 7, the method may further include:
S701: obtaining a second preset material;
S5702: determining a placement position of the second preset material inside the target object image and a target size of the second preset material, according to the at least one connection point; and
S703: adjusting the second preset material to the target size, and synthesizing an adjusted second preset material and the target object image according to the placement position.

In the embodiment, after obtaining the second preset material, determining a placement position of the second preset material inside the target object image and a target size of the second preset material, according to the at least one determined connection point. For example, determining an origin for establishing a coordinate axis according to the at least one determined connection point, and establishing the coordinate axis based on the origin; and then determining the placement position of the second preset material inside the target object image and the target size of the second preset material, according to the coordinate axis.

Taking two connection points for example, in the embodiment, the two connection points may be connected by a connection line, taking a specific position of the connection line as the origin for establishing the coordinate axis. For example, with a center of the connection line as the origin for establishing the coordinate axis, and with the connection line as one coordinate axis, establishing another coordinate axis to form a coordinate system. The placement position of the second preset material is determined in the coordinate system, and the target size of the second preset material may also be determined according to a length of the connection line, and then, after adjusting the second preset material to the target size, placing the second preset material at the determined placement position to realize the synthesis of the second preset material and the target object image. The size and position of the second preset material in synthesis result are relatively reasonable, and the image synthesis effect expected by the user can be achieved.

It is necessary to explain that the second preset material may also include the animation material. For example, the second preset material is an expression animation material with a certain motion. After a synthesis of the expression animation material and the target object image, the obtained synthesis result may be displayed dynamically, and that is, expressions are displayed on the target object image and may perform the specific motion, such as smiling, blinking and the like. Further, after the first preset material and the second preset material are synthesized on the target object image, the synthesis result may be displayed, that is, the first preset material and the second preset material may perform motions simultaneously or alternately, and that is, animations of the first preset material and the second preset material are played simultaneously or alternately, so that the synthesis result may be dynamically displayed. Further, optionally, it is also possible to perform the three-dimensional processing on the synthesis result to convert the synthesis result in the form of the two-dimensional image into the three-dimensional image, so as to dynamically display the synthesis result after the three-dimensional processing. For example, after the three-dimensionally processing of the target object image, the first preset material and/or the second preset material may perform specific motions in the three-dimensional space, which can be applied to fields such as the Augmented Reality (AR) technology.

Figure 8:
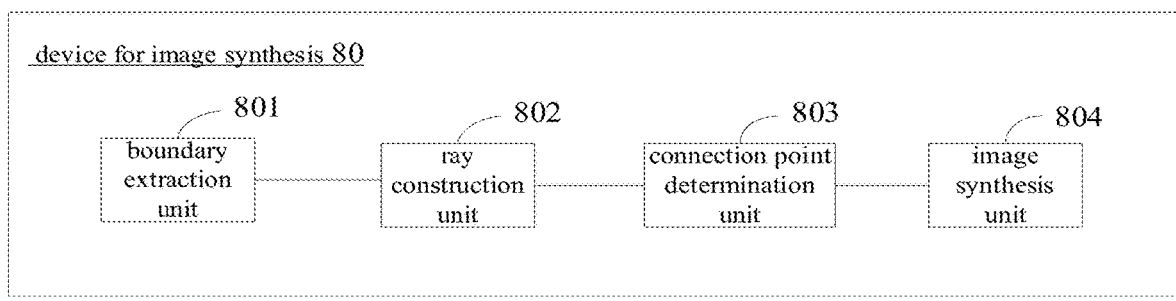
FIG. 8 is a structural block diagram of a device for image synthesis provided in an embodiment of the present disclosure.

Corresponding to the method for image synthesis of the above embodiment, FIG. 8 is a structural block diagram of a device for image synthesis provided by an embodiment of the present disclosure. For convenience of explanation, only the parts related to the embodiments of the present disclosure are shown in FIG. 8. Referring to FIG. 8, the device for image synthesis 80 includes a boundary extraction unit 801, a ray construction unit 802, a connection point determination unit 803, and an image synthesis unit 804.

The boundary extraction unit 801 is configured for performing a convex hull extraction on a target object image in an image to be processed to obtain a first boundary frame line; and zooming out the first boundary frame line toward a center of the first boundary frame line according to a preset ratio to obtain a second boundary frame line.

The ray construction unit 802 is configured for determining, according to the target object image, at least one target ray where at least one connection point is located in synthesizing a first preset material with the target object image.

The connection point determination unit 803 is configured for determining the at least one connection point between the first preset material and the target object image, according to the first boundary frame line, the second boundary frame line, a contour of the target object image, and the at least one target ray.

The image synthesis unit 804 is configured for synthesizing the first preset material and the target object image according to the at least one connection point, and displaying a synthesis result.

According to one or more embodiments of the present disclosure, when determining the at least one connection point between the first preset material and the target object image according to the first boundary frame line, the second boundary frame line, a contour of the target object image, and the at least one target ray, the connection point determination unit 803 is configured for:

for any one target ray of the at least one target ray, determining a first intersection point or a second intersection point as one connection point between the first preset material and the target object image, wherein the first intersection point is an intersection point between the any one target ray and the second boundary frame line, and the second intersection point is an intersection point between the any one target ray and the contour of the target object image.

According to one or more embodiments of the present disclosure, when for any one target ray of the at least one target ray, determining a first intersection point or a second intersection point as one connection point between the first preset material and the target object image, the connection point determination unit 803 is configured for:

for the any one target ray, obtaining a third intersection point between the any one target ray and the first boundary frame line; and with the third intersection point as a beginning point, searching for a firstly appeared intersection point on the any one target ray along a direction of the any one target ray toward an interior of the target object image, taking the firstly appeared intersection point as the one connection point between the first preset material and the target object image; wherein the firstly appeared intersection point is the first intersection point between the any one target ray and the second boundary frame line, or the second intersection point between the any one target ray and the contour of the target object image.

According to one or more embodiments of the present disclosure, when for any one target ray of the at least one target ray, determining a first intersection point or a second intersection point as one connection point between the first preset material and the target object image, the connection point determination unit 803 is configured for:

for the any one target ray, obtaining the first intersection point between the any one target ray and the second boundary frame line and the second intersection point between the any one target ray and the contour of the target object image;

determining an intersection point closer to the first boundary frame line from the first intersection point and the second intersection point; and determining the intersection point closer to the first boundary frame line as the one connection point between the first preset material and the target object image.

According to one or more embodiments of the present disclosure, when determining, according to the target object image, at least one target ray where at least one connection point is located when synthesizing a first preset material with the target object image, the ray construction unit 802 is configured for:

determining a count of axes in performing an axis extraction on the target object image according to a type of the first preset material;

performing the axis extraction on the target object image according to the count of the axes to obtain at least one axis; and correspondingly determining the at least one target ray according to the at least one axis, and the at least one target ray and the at least one axis respectively forming a preset included angle.

According to one or more embodiments of the present disclosure, the count of the axes is two, when performing the axis extraction on the target object image, the ray construction unit 802 is configured for:

performing a principal component analysis on the target object image by a principle component analysis algorithm, to extract a first axis and a second axis of the target object image.

According to one or more embodiments of the present disclosure, when correspondingly determining the at least one target ray according to the axes, the ray construction unit 802 is configured for:

taking an intersection point between the first axis and the second axis as a starting endpoint of the at least one target ray; and creating the at least one target ray that starts from the starting endpoint and forms a corresponding preset included angle with the first axis or the second axis.

According to one or more embodiments of the present disclosure, when correspondingly determining the at least one target ray according to the axes, the connection point determination unit 803 is further configured for:

in a case where a length-width ratio of the target object image exceeds a preset threshold, performing at least one of following steps according to the length-width ratio of the target object image:

translating the first axis or the second axis; and adjusting the preset included angle.

According to one or more embodiments of the present disclosure, the image synthesis unit 804 is further configured for:

obtaining a second preset material;

determining a placement position of the second preset material inside the target object image and a target size of the second preset material, according to the at least one connection point; and adjusting the second preset material to the target size and synthesizing an adjusted second preset material and the target object image according to the placement position.

According to one or more embodiments of the present disclosure, when determining a placement position of the second preset material inside the target object image and a target size of the second preset material, according to the at least one connection point, the image synthesis unit 804 is configured for:

determining an origin for establishing a coordinate axis according to the at least one connection point, and establishing the coordinate axis based on the origin; and determining the placement position of the second preset material inside the target object image and the target size of the second preset material, according to the coordinate axis.

According to one or more embodiments of the present disclosure, before the boundary extraction unit 801 performing a convex hull extraction on a target object image in an image to be processed, the boundary extraction unit 801 is further configured for:

performing an object segmentation on a target object in the image to be processed to obtain the target object image.

According to one or more embodiments of the present disclosure, the first preset material is an animation material; and when displaying the synthesis result, the image synthesis unit 804 is further configured for: dynamically displaying the synthesis result.

The device for image synthesis provided by the embodiment may be used to implement the technical scheme of the above-mentioned method for image synthesis, and the implementation principle and technical effect of the device and the method are similar, so this embodiment will not be repeated here.

Figure 9:
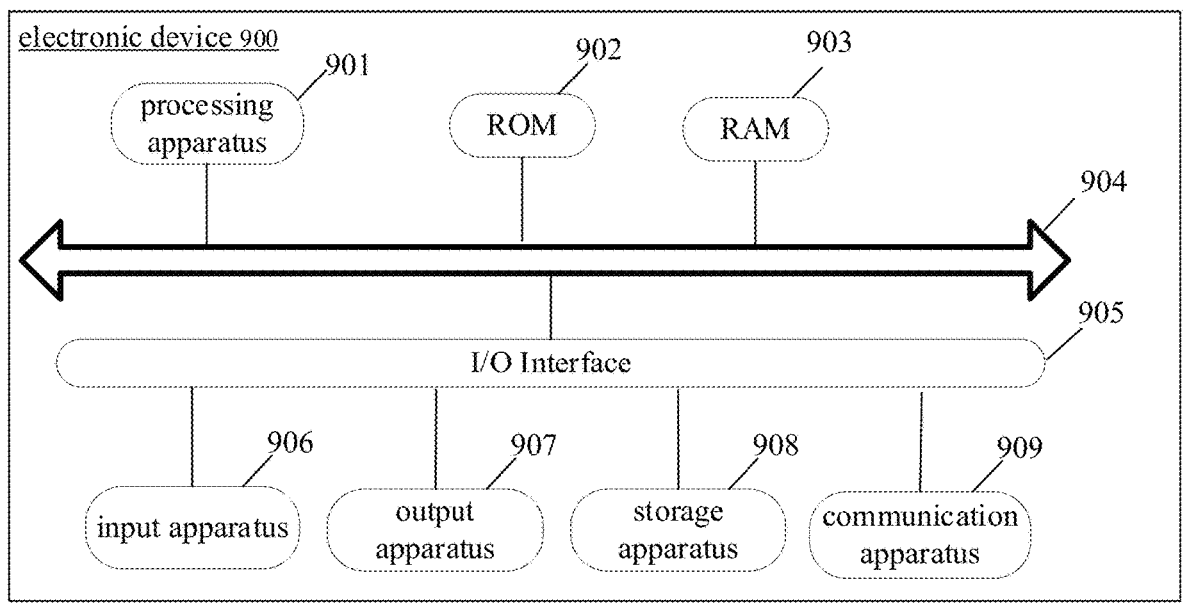
FIG. 9 is a schematic diagram of a hardware structure of an electronic device provided in an embodiment of the present disclosure.

Referring to FIG. 9, FIG. 9 shows a schematic structural diagram of an electronic device 900 suitable for implementing the embodiments of the present disclosure. The device 900 may be a terminal device or a server. The terminal device may include but is not limited to mobile terminal such as a mobile phone, a notebook computer, a digital broadcast receiver, a Personal Digital Assistant (abbreviated to PDA), a Portable Android Device (abbreviated to PAD), a Portable Media Players (PMP), a in-vehicle terminal (e.g., in-vehicle navigation terminal) and a wearable electronic device, and a stationary terminal such as a digital TV, a desktop computer and a smart home device. The electronic device shown in FIG. 9 is only an example and should not impose any limitation on functions and use scopes of the embodiments of the present disclosure.

As shown in FIG. 9, the electronic device 900 may include a processing apparatus 901 (e.g., a central processing unit, a graphics processor, etc.), the processing apparatus 901 may perform various appropriate actions and processes according to programs stored in a Read Only Memory (abbreviated to ROM) 902 or programs loaded from a storage device 908 into a Random-Access Memory (abbreviated to RAM) 903. In the RAM 903, various programs and data necessary for an operation of the electronic device 900 are also stored. The processing device 901, the ROM 902, and the RAM 903 are connected to each other via a bus 904 to which an input/output (I/O) interface 905 is also connected.

Generally, the following apparatus may be connected to the I/O interface 905: an input apparatus 906 including, for example, a touch screen, a touch pad, a keyboard, a mouse, a camera, a microphone, an accelerometer, a gyroscope and the like; an output apparatus 907 including, for example, a Liquid Crystal Display (abbreviated to LCD), a speaker, a vibrator and the like; a storage apparatus 908 including, for example, a magnetic tape, a hard disk and the like; and a communication apparatus 909. The communication apparatus 909 may allow the electronic device 900 to communicate with other devices in a wireless or wire way to exchange data. Although FIG. 9 shows the electronic device 900 with various apparatus, it should be understood that all the illustrated apparatus are not required to be implemented or provided, and alternatively, more or fewer apparatus may be implemented or provided.

In particular, according to the embodiments of the present disclosure, processes described above with reference to the flow diagrams may be implemented as computer software programs. For example, the embodiments of the present disclosure include a computer program product comprising a computer program carried on a computer-readable medium, the computer-readable medium comprises program codes for executing the methods shown in the flow diagrams to realize the method and function for image synthesis described in the embodiments of the present disclosure. In such embodiments, the computer program may be downloaded and installed from a network via the communication apparatus 909, may be installed from the storage apparatus 908, or may be installed from the ROM 902. When the computer program is executed by the processing apparatus 901, the above functions defined in the method in the embodiments of the present disclosure are executed.

It is necessary to explain that the above computer-readable medium in the present disclosure may be a computer-readable signal medium, a computer-readable storage medium, or any combination thereof. The computer readable storage medium may be but is not limited to, for example, an electrical, magnetic, optical, electromagnetic, infrared or semiconductor system, apparatus or device, or any combination thereof. More specific examples of the computer readable storage media may include but are not limited to, electrical connections with one or more wires, portable computer disks, hard disks, Random Access Memories (RAMs), Read Only Memories (ROMs), Erasable Programmable Read Only Memories (EPROMs or flash memories), optical fibers, portable Compact Disk Read Only Memories (CD-ROMs), optical storage devices, magnetic storage devices, or any suitable combination thereof. In the disclosure, the computer-readable storage medium may be any tangible medium containing or storing a program that may be used by or in combination with an instruction execution system, apparatus, or device. In the present disclosure, however, the computer-readable signal medium may include a data signal propagated in a baseband or as part of a carrier wave, and the computer-readable program codes are carried in the data signal. This propagated data signal may take a variety of forms, including but not limited to an electromagnetic signal, an optical signal, or any suitable combination thereof. The computer-readable signal medium may also be any computer-readable medium other than the computer-readable storage medium, which may transmit, propagate, or convey the program used by or in combination with the instruction execution system, apparatus, or device. Program codes contained on the computer-readable medium can be conveyed with any suitable mediums including but not limited to: wires, optical cables, RFs (Radio Frequencies) and so on, or any suitable combination thereof.

The above computer-readable medium may be contained in the above electronic device, or may exist alone without assembled into the electronic device.

The above computer-readable medium carries one or more programs. When the above one or more programs are executed by the electronic device, the electronic device is caused to execute the method shown in the above embodiments.

Computer program codes for performing operations in the present disclosure may be written in one or more Program Design Languages or combinations thereof, including object-oriented Program Design Languages such as Java, Smalltalk and C++, and conventional procedural Program Design Languages such as C language or similar Program Design Languages. The program codes may be executed entirely on a user computer, partly on the user computer, as a stand-alone software package, partly on the user computer and partly on a remote computer, or entirely on the remote computer or server. In the case of the remote computer, the remote computer may be connected to the user computer via any kind of network including a Local Area Network (abbreviated to LAN) or Wide Area Network (abbreviated to WAN), or may be connected to an external computer (for example, via the Internet by an Internet service provider).

The flow diagrams and block diagrams in the drawings illustrate possibly achievable system architecture, functions and operations of systems, methods and computer program products according to various embodiments of the present disclosure. In this regard, each block in the flow diagrams or the block diagrams may represent a module, a program segment, or a part of a code, which contains one or more executable instructions for realizing specified logical functions. It should also be noted that in some alternative implementations, the functions marked in the blocks may occur in different orders from those marked in the drawings. For example, two blocks shown in succession may actually be executed substantially in parallel, or may sometimes be executed in a reverse order, which depends upon the functions involved. It should be also noted that each block in the block diagrams and/or the flow diagrams, or combinations thereof, may be implemented by a dedicated hardware-based system performing the specified functions or operations, or by a combination of a dedicated hardware and computer instructions.

Involved units described in the embodiments of the present disclosure may be implemented in a software manner and may also be implemented in a hardware manner. Names of the units do not constitute limitations on the units themselves in some cases, and for example, a first obtaining unit may also be described as "a unit that can obtain at least two Internet Protocol addresses".

The functions described above herein may be performed at least in part by one or more hardware logic components. For example, without limitation, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and the like.

In the context of the present disclosure, a machine-readable medium may be a tangible medium that may contain or store the program used by or in combination with the instruction execution system, apparatus or device. The machine-readable medium may be a machine-readable signal medium or a machine-readable storage medium. The machine-readable media may include but is not limited to, an electronic, magnetic, optical, electromagnetic, infrared, or semiconductor system, apparatus or device, or any suitable combination thereof. More specific examples of the machine-readable storage media include electrical connections based on one or more wires, portable computer disks, hard disks, Random Access Memories (RAMs), Read Only Memories (ROMs), Erasable Programmable Read Only Memories (EPROMs or Flash Memories), fiber optics, portable Compact Disk Read Only Memories (CD-ROMs), optical storage devices, magnetic storage devices, or any suitable combination thereof.

In the first aspect, according to one or more embodiments of the present disclosure, a method for image synthesis is provided, the method comprises:

performing a convex hull extraction on a target object image in an image to be processed to obtain a first boundary frame line;

zooming out the first boundary frame line toward a center of the first boundary frame line according to a preset ratio to obtain a second boundary frame line;

determining, according to the target object image, at least one target ray where at least one connection point is located in synthesizing a first preset material with the target object image;

determining the at least one connection point between the first preset material and the target object image, according to the first boundary frame line, the second boundary frame line, a contour of the target object image, and the at least one target ray; and synthesizing the first preset material and the target object image according to the at least one connection point, and displaying a synthesis result.

According to one or more embodiments of the present disclosure, the determining the at least one connection point between the first preset material and the target object image according to the first boundary frame line, the second boundary frame line, a contour of the target object image, and the at least one target ray, comprises:

for any one target ray of the at least one target ray, determining a first intersection point or a second intersection point as one connection point between the first preset material and the target object image, wherein the first intersection point is an intersection point between the any one target ray and the second boundary frame line, and the second intersection point is an intersection point between the any one target ray and the contour of the target object image.

According to one or more embodiments of the present disclosure, the for any one target ray of the at least one target ray, determining a first intersection point or a second intersection point as one connection point between the first preset material and the target object image, comprises:

for the any one target ray, obtaining a third intersection point between the any one target ray and the first boundary frame line; and with the third intersection point as a beginning point, searching for a firstly appeared intersection point on the any one target ray along a direction of the any one target ray toward an interior of the target object image, taking the firstly appeared intersection point as the one connection point between the first preset material and the target object image; wherein the firstly appeared intersection point is the first intersection point between the any one target ray and the second boundary frame line, or the second intersection point between the any one target ray and the contour of the target object image.

According to one or more embodiments of the present disclosure, the for any one target ray of the at least one target ray, determining a first intersection point or a second intersection point as one connection point between the first preset material and the target object image, comprises:

for the any one target ray, obtaining the first intersection point between the any one target ray and the second boundary frame line and the second intersection point between the any one target ray and the contour of the target object image;

determining an intersection point closer to the first boundary frame line from the first intersection point and the second intersection point; and determining the intersection point closer to the first boundary frame line as the one connection point between the first preset material and the target object image.

According to one or more embodiments of the present disclosure, the determining, according to the target object image, at least one target ray where at least one connection point is located when synthesizing a first preset material with the target object image, comprises:

determining a count of axes in performing an axis extraction on the target object image according to a type of the first preset material;

performing the axis extraction on the target object image according to the count of the axes; and correspondingly determining the at least one target ray according to the axes, and the at least one target ray and the axes respectively forming a preset included angle.

According to one or more embodiments of the present disclosure, the count of the axes is two, and the performing the axis extraction on the target object image, comprises:

performing a principal component analysis on the target object image by a principle component analysis algorithm, to extract a first axis and a second axis of the target object image.

According to one or more embodiments of the present disclosure, the correspondingly determining the at least one target ray according to the axes, comprises:

taking an intersection point between the first axis and the second axis as a starting endpoint of the at least one target ray; and creating the at least one target ray that starts from the starting endpoint and forms a corresponding preset included angle with the first axis or the second axis.

According to one or more embodiments of the present disclosure, the method further comprising:

in a case where a length-width ratio of the target object image exceeds a preset threshold, performing at least one of following steps according to the length-width ratio of the target object image:

translating the first axis or the second axis; and adjusting the preset included angle.

According to one or more embodiments of the present disclosure, further comprising:

obtaining a second preset material;

determining a placement position of the second preset material inside the target object image and a target size of the second preset material, according to the at least one connection point; and adjusting the second preset material to the target size, and synthesizing an adjusted second preset material and the target object image according to the placement position.

According to one or more embodiments of the present disclosure, the determining a placement position of the second preset material inside the target object image and a target size of the second preset material, according to the at least one connection point, comprises:

determining an origin for establishing a coordinate axis according to the at least one connection point, and establishing the coordinate axis based on the origin; and determining the placement position of the second preset material inside the target object image and the target size of the second preset material, according to the coordinate axis.

According to one or more embodiments of the present disclosure, before the performing a convex hull extraction on a target object image in an image to be processed, the method further comprises:

performing an object segmentation on a target object in the image to be processed to obtain the target object image.

According to one or more embodiments of the present disclosure, the first preset material is an animation material; and the displaying a synthesis result comprises:

playing the animation material to dynamically display the synthesis result.

In the second aspect, According to one or more embodiments of the present disclosure, a device for image synthesis is provided, and the device for image synthesis comprises:

a boundary extraction unit, configured to perform a convex hull extraction on a target object image in an image to be processed to obtain a first boundary frame line, and to zoom out the first boundary frame line toward a center of the first boundary frame line according to a preset ratio to obtain a second boundary frame line;

a ray construction unit, configured to determine, according to the target object image, at least one target ray where at least one connection point is located in synthesizing a first preset material with the target object image;

a connection point determination unit, configured to determine the at least one connection point between the first preset material and the target object image, according to the first boundary frame line, the second boundary frame line, a contour of the target object image, and the at least one target ray; and an image synthesis unit, configured to synthesize the first preset material and the target object image according to the at least one connection point, and to display a synthesis result.

According to one or more embodiments of the present disclosure, when determining the at least one connection point between the first preset material and the target object image according to the first boundary frame line, the second boundary frame line, a contour of the target object image, and the at least one target ray, the connection point determination unit is configured for:

for any one target ray of the at least one target ray, determining a first intersection point or a second intersection point as one connection point between the first preset material and the target object image, wherein the first intersection point is an intersection point between the any one target ray and the second boundary frame line, and the second intersection point is an intersection point between the any one target ray and the contour of the target object image.

According to one or more embodiments of the present disclosure, when for any one target ray of the at least one target ray, determining a first intersection point or a second intersection point as one connection point between the first preset material and the target object image, the connection point determination unit is configured for:

for the any one target ray, obtaining a third intersection point between the any one target ray and the first boundary frame line; and with the third intersection point as a beginning point, searching for a firstly appeared intersection point on the any one target ray along a direction of the any one target ray toward an interior of the target object image, taking the firstly appeared intersection point as the one connection point between the first preset material and the target object image; wherein the firstly appeared intersection point is the first intersection point between the any one target ray and the second boundary frame line, or the second intersection point between the any one target ray and the contour of the target object image.

According to one or more embodiments of the present disclosure, when for any one target ray of the at least one target ray, determining a first intersection point or a second intersection point as one connection point between the first preset material and the target object image, the connection point determination unit is configured for:

for the any one target ray, obtaining the first intersection point between the any one target ray and the second boundary frame line and the second intersection point between the any one target ray and the contour of the target object image;

determining an intersection point closer to the first boundary frame line from the first intersection point and the second intersection point; and determining the intersection point closer to the first boundary frame line as the one connection point between the first preset material and the target object image.

According to one or more embodiments of the present disclosure, when determining, according to the target object image, at least one target ray where at least one connection point is located when synthesizing a first preset material with the target object image, the ray construction unit is configured for:

determining a count of axes in performing an axis extraction on the target object image according to a type of the first preset material;

performing the axis extraction on the target object image according to the count of the axes to obtain at least one axis; and correspondingly determining the at least one target ray according to the at least one axis, and the at least one target ray and the at least one axis respectively forming a preset included angle.

According to one or more embodiments of the present disclosure, the count of the axes is two, when performing the axis extraction on the target object image, the ray construction unit is configured for:

performing a principal component analysis on the target object image by a principle component analysis algorithm, to extract a first axis and a second axis of the target object image.

According to one or more embodiments of the present disclosure, when correspondingly determining the at least one target ray according to the axes, the ray construction unit is configured for:

taking an intersection point between the first axis and the second axis as a starting endpoint of the at least one target ray; and creating the at least one target ray that starts from the starting endpoint and forms a corresponding preset included angle with the first axis or the second axis.

According to one or more embodiments of the present disclosure, when correspondingly determining the at least one target ray according to the axes, the connection point determination unit is further configured for:

in a case where a length-width ratio of the target object image exceeds a preset threshold, performing at least one of following steps according to the length-width ratio of the target object image:
translating the first axis or the second axis; and
adjusting the preset included angle.

According to one or more embodiments of the present disclosure, the image synthesis unit is further configured for:
obtaining a second preset material;
determining a placement position of the second preset material inside the target object image and a target size of the second preset material, according to the at least one connection point; and
adjusting the second preset material to the target size, and synthesizing an adjusted second preset material and the target object image according to the placement position.

According to one or more embodiments of the present disclosure, when determining a placement position of the second preset material inside the target object image and a target size of the second preset material, according to the at least one connection point, the image synthesis unit is configured for:
determining an origin for establishing a coordinate axis according to the at least one connection point, and establishing the coordinate axis based on the origin; and
determining the placement position of the second preset material inside the target object image and the target size of the second preset material, according to the coordinate axis.

According to one or more embodiments of the present disclosure, before the boundary extraction unit performing a convex hull extraction on a target object image in an image to be processed, the boundary extraction unit is further configured for:
performing an object segmentation on a target object in the image to be processed to obtain the target object image.

According to one or more embodiments of the present disclosure, the first preset material is an animation material; and when displaying the synthesis result, the image synthesis unit 804 is further configured for: dynamically displaying the synthesis result.

In the third aspect, according to one or more embodiments of the present disclosure, an electronic device is provided, and the electronic device comprises: at least one processor; and
a memory;
wherein the memory stores a computer execution instruction, the at least one processor executes the computer execution instruction stored in the memory, causing the electronic device to perform the method for image synthesis described in the first aspect and various possible designs of the first aspect.

In the fourth aspect, one or more embodiments of the present disclosure provides a computer-readable storage medium, wherein the computer-readable storage medium stores a computer execution instruction, and in a case where a processor executes the computer execution instruction, the method for image synthesis described in the first aspect and various possible designs of the first aspect is realized.

The above descriptions are merely optional embodiments of the present disclosure and illustrations of the technical principles employed. Those skilled in the art should understand that the scope of disclosure involved in the present disclosure is not limited to the technical solutions formed by the specific combination of the above-mentioned technical features, and should also cover, without departing from the above-mentioned disclosed concept, the technical solutions formed by the above-mentioned technical features or other technical solutions formed by any combination of its equivalent features. For example, a technical solution is formed by replacing the above features with the technical features disclosed in the present disclosure (but not limited to) with similar functions.

Furthermore, although operations are depicted in a particular order, this should not be construed as requiring that the operations be performed in the particular order shown or in a sequential order. Under certain circumstances, multi-tasking and parallel processing may be advantageous. Likewise, although the above discussion contains several implementation-specific details, these should not be construed as limitations on the scope of the present disclosure. Certain features that are described in the context of separate embodiments can also be implemented in combination in a single embodiment. Conversely, various features that are described in the context of a single embodiment may also be implemented in embodiments separately or in any suitable combination.

Although the subject matter has been described in language specific to structural features and/or logical acts of method, it is to be understood that the subject matter defined in the appended claims is not necessarily limited to the specific features or acts described above. Rather, the specific features and acts described above are merely example forms of implementing the claims.

What is claimed is:

1. A method for image synthesis, comprising:
performing a convex hull extraction on a target object image in an image to be processed to obtain a first boundary frame line;
zooming out the first boundary frame line toward a center of the first boundary frame line according to a preset ratio to obtain a second boundary frame line;
determining, according to the target object image, at least one target ray where at least one connection point is located in synthesizing a first preset material with the target object image;
determining the at least one connection point between the first preset material and the target object image, according to the first boundary frame line, the second boundary frame line, a contour of the target object image, and the at least one target ray; and
synthesizing the first preset material and the target object image according to the at least one connection point, and displaying a synthesis result.

2. The method according to claim 1, wherein the determining the at least one connection point between the first preset material and the target object image according to the first boundary frame line, the second boundary frame line, the contour of the target object image, and the at least one target ray, comprises:
for any one target ray of the at least one target ray, determining a first intersection point or a second intersection point as a particular connection point between the first preset material and the target object image, wherein the first intersection point is an intersection point between the any one target ray and the second boundary frame line, and the second intersection point is an intersection point between the any one target ray and the contour of the target object image.

3. The method according to claim 2, wherein for the any one target ray of the at least one target ray, the determining the first intersection point or the second intersection point as the particular connection point between the first preset material and the target object image, comprises:
for the any one target ray, obtaining a third intersection point between the any one target ray and the first boundary frame line; and
with the third intersection point as a beginning point, searching for a firstly appeared intersection point on the any one target ray along a direction of the any one target ray toward an interior of the target object image, taking the firstly appeared intersection point as the particular connection point between the first preset material and the target object image; wherein the firstly appeared intersection point is the first intersection point between the any one target ray and the second boundary frame line, or the second intersection point between the any one target ray and the contour of the target object image.

4. The method according to claim 2, wherein for the any one target ray of the at least one target ray, the determining the first intersection point or the second intersection point as the particular connection point between the first preset material and the target object image, comprises:
for the any one target ray, obtaining the first intersection point between the any one target ray and the second boundary frame line and the second intersection point between the any one target ray and the contour of the target object image;
determining an intersection point closer to the first boundary frame line from the first intersection point and the second intersection point; and
determining the intersection point closer to the first boundary frame line as the particular connection point between the first preset material and the target object image.

5. The method according to claim 1, wherein the determining, according to the target object image, the at least one target ray where the at least one connection point is located when synthesizing the first preset material with the target object image, comprises:
determining a count of axes in performing an axis extraction on the target object image according to a type of the first preset material;
performing the axis extraction on the target object image according to the count of the axes to obtain at least one axis; and
correspondingly determining the at least one target ray according to the at least one axis, and the at least one target ray and the at least one axis respectively forming a preset included angle.

6. The method according to claim 5, wherein the count of the axes is two, and the performing the axis extraction on the target object image, comprises:
performing a principal component analysis on the target object image by a principle component analysis algorithm, to extract a first axis and a second axis of the target object image.

7. The method according to claim 6, wherein the correspondingly determining the at least one target ray according to the at least one axis, comprises:
taking an intersection point between the first axis and the second axis as a starting endpoint of the at least one target ray; and
creating the at least one target ray that starts from the starting endpoint and forms a corresponding preset included angle with the first axis or the second axis.

8. The method according to claim 6, further comprising:
in a case where a length-width ratio of the target object image exceeds a preset threshold, performing at least one of following steps according to the length-width ratio of the target object image:
translating the first axis or the second axis; and
adjusting the preset included angle.

9. The method according to claim 1, further comprising:
obtaining a second preset material;
determining a placement position of the second preset material inside the target object image and a target size of the second preset material, according to the at least one connection point; and
adjusting the second preset material to the target size to obtain an adjusted material, and synthesizing the adjusted material and the target object image according to the placement position.

10. The method according to claim 9, wherein the determining the placement position of the second preset material inside the target object image and the target size of the second preset material, according to the at least one connection point, comprises:
determining an origin for establishing a coordinate axis according to the at least one connection point, and establishing the coordinate axis based on the origin; and
determining the placement position of the second preset material inside the target object image and the target size of the second preset material, according to the coordinate axis.

11. The method according to claim 1, wherein before the performing the convex hull extraction on the target object image in the image to be processed, the method further comprises:
performing an object segmentation on a target object in the image to be processed to obtain the target object image.

12. The method according to claim 1, wherein the first preset material is an animation material; and
the displaying the synthesis result comprises:
playing the animation material to dynamically display the synthesis result.

13. The method according to claim 12, wherein the playing the animation material to dynamically display the synthesis result, comprises:
performing a three-dimensional processing on the synthesis result, and dynamically displaying the synthesis result subjected to the three-dimensional processing.

14. An electronic device, comprising:
at least one processor; and
a memory;
wherein the memory stores computer execution instructions, and wherein the the computer execution instructions stored in the memory, when executed by the at least one processor, cause the electronic device to perform operations for image synthesis, and the operations comprise:
performing a convex hull extraction on a target object image in an image to be processed to obtain a first boundary frame line;
zooming out the first boundary frame line toward a center of the first boundary frame line according to a preset ratio to obtain a second boundary frame line;
determining, according to the target object image, at least one target ray where at least one connection point is located in synthesizing a first preset material with the target object image;

determining the at least one connection point between the first preset material and the target object image, according to the first boundary frame line, the second boundary frame line, a contour of the target object image, and the at least one target ray; and synthesizing the first preset material and the target object image according to the at least one connection point, and displaying a synthesis result.

15. The electronic device according to claim 14, wherein the determining the at least one connection point between the first preset material and the target object image according to the first boundary frame line, the second boundary frame line, the contour of the target object image, and the at least one target ray, comprises:

for any one target ray of the at least one target ray, determining a first intersection point or a second intersection point as a particular connection point between the first preset material and the target object image, wherein the first intersection point is an intersection point between the any one target ray and the second boundary frame line, and the second intersection point is an intersection point between the any one target ray and the contour of the target object image.

16. The electronic device according to claim 14, wherein the determining, according to the target object image, the at least one target ray where the at least one connection point is located when synthesizing the first preset material with the target object image, comprises:

determining a count of axes in performing an axis extraction on the target object image according to a type of the first preset material;

performing the axis extraction on the target object image according to the count of the axes to obtain at least one axis; and correspondingly determining the at least one target ray according to the at least one axis, and the at least one target ray and the at least one axis respectively forming a preset included angle.

17. The electronic device according to claim 14, the operations further comprising:

obtaining a second preset material;

determining a placement position of the second preset material inside the target object image and a target size of the second preset material, according to the at least one connection point; and adjusting the second preset material to the target size to obtain an adjusted material, and synthesizing the adjusted material and the target object image according to the placement position.

18. The electronic device according to claim 14, wherein before the performing the convex hull extraction on the target object image in the image to be processed, the operations further comprise:

performing an object segmentation on a target object in the image to be processed to obtain the target object image.

19. The electronic device according to claim 14, wherein the first preset material is an animation material; and wherein the displaying the synthesis result comprises playing the animation material to dynamically display the synthesis result.

20. A non-transitory computer-readable storage medium, wherein the computer-readable storage medium stores computer execution instructions, and wherein the computer execution instructions, when executed by a processor, cause the processor to implement operations for image synthesis, the operations comprising:

performing a convex hull extraction on a target object image in an image to be processed to obtain a first boundary frame line;

zooming out the first boundary frame line toward a center of the first boundary frame line according to a preset ratio to obtain a second boundary frame line;

determining, according to the target object image, at least one target ray where at least one connection point is located in synthesizing a first preset material with the target object image;

determining the at least one connection point between the first preset material and the target object image based on the first boundary frame line, the second boundary frame line, a contour of the target object image, and the at least one target ray; and synthesizing the first preset material and the target object image according to the at least one connection point, and displaying a synthesis result.

* * * * *